United States Patent
Sakakibara

(10) Patent No.: US 9,355,582 B2
(45) Date of Patent: May 31, 2016

(54) SOLID-STATE IMAGE SENSOR AND DRIVING METHOD

(71) Applicant: Sony Corporation, Tokyo (JP)

(72) Inventor: Masaki Sakakibara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 64 days.

(21) Appl. No.: 13/866,058

(22) Filed: Apr. 19, 2013

(65) Prior Publication Data

US 2013/0307837 A1   Nov. 21, 2013

(30) Foreign Application Priority Data

May 21, 2012   (JP) .................... 2012-115409

(51) Int. Cl.
    *G09G 3/00*    (2006.01)
    *H04N 5/357*    (2011.01)
    *H04N 5/369*    (2011.01)
    *H04N 5/374*    (2011.01)

(52) U.S. Cl.
    CPC .............. *G09G 3/001* (2013.01); *H04N 5/3577* (2013.01); *H04N 5/3698* (2013.01); *H04N 5/374* (2013.01)

(58) Field of Classification Search
CPC ....... G09G 5/00; G09G 3/001; H04N 5/3698; H04N 5/3577; H04N 5/374
USPC .................................................. 345/212–214
See application file for complete search history.

(56) References Cited

U.S. PATENT DOCUMENTS

| | | | |
|---|---|---|---|
| 7,554,514 B2 * | 6/2009 | Nozawa ............... | G09G 3/2014 345/76 |
| 2010/0128017 A1 * | 5/2010 | Yamada ........................ | 345/212 |
| 2010/0302228 A1 * | 12/2010 | Ishiguro et al. ............... | 345/211 |

FOREIGN PATENT DOCUMENTS

| | | |
|---|---|---|
| JP | 2007-067682 A | 3/2007 |
| JP | 2008-054246 A | 3/2008 |

* cited by examiner

*Primary Examiner* — Andrew Sasinowski
(74) *Attorney, Agent, or Firm* — Chip Law Group; Pramod Chintalapoodi

(57) ABSTRACT

There is provided a solid-state image sensor including a pixel circuit including a plurality of pixels and imaging a subject, a peripheral circuit provided in a vicinity of the pixel circuit and performing operation in regard to imaging, and a connection element electrically connecting, in initialization of the pixels, elements in the pixels to which a predetermined voltage is applied for initializing the pixels to the peripheral circuit with the predetermined voltage.

18 Claims, 5 Drawing Sheets

SOLID-STATE IMAGE SENSOR AND DRIVING METHOD

BACKGROUND

The present technology relates to a solid-state image sensor and a driving method, and specifically, relates to a solid-state image sensor and a driving method capable of suppressing increase in area of an image sensor and reducing impedance of pixels.

For example, an image sensor which performs imaging by performing photoelectric conversion on light incident from the subject causes a drop of power supply (voltage drop) in driving for initialization of pixels, for example, in resetting the pixels constituting the image sensor. Such a drop of power supply is known larger as the number of pixels of the image sensor is larger.

Therefore, in order to relieve such a drop of power supply, there is a typical measure of reducing impedance by making power supply wirings for supplying power to pixels and/or power supply wirings of the pixels themselves thick.

Moreover, there is also an image sensor in which two power supply lines as power supply wirings of a peripheral circuit of pixels are provided along a signal processing part, interposing common signal lines, and these power supply lines are connected with a cross connection line, this improving a signal readout speed (for example, see Japanese Patent Laid-Open No. 2008-054246).

Furthermore, there is also proposed an image sensor in which a plurality of power supply parts capable of supplying a plurality of predetermined potentials are provided and the potentials supplied from these power supply parts to pixels are selectively switched to distribute circuit load (for example, see Japanese Patent Laid-Open No. 2007-067682).

SUMMARY

However, in the above-mentioned technologies, making power supply wirings and the like thick in order to reduce impedance of the pixels causes increase in wiring areas of the image sensor, that is, an area of the image sensor, resulting in increase of costs.

Moreover, the wiring way in which two power supply lines are provided and these power supply lines are connected with a cross connection line means making wirings surrounding the target circuit thick in order to reduce impedance of power supply, this causing the increase in wiring areas. Furthermore, the image sensor in which a plurality of power supply parts for selectively switching supply potentials are provided becomes large by the area in the image sensor which area corresponds to these power supply parts.

It is desirable to provide an image sensor in which increase in area thereof can be suppressed and impedance of pixels can be reduced.

According to an embodiment of the present technology, there is provided a solid-state image sensor including a pixel circuit including a plurality of pixels and imaging a subject, a peripheral circuit provided in a vicinity of the pixel circuit and performing operation in regard to imaging, and a connection element electrically connecting, in initialization of the pixels, elements in the pixels to which a predetermined voltage is applied for initializing the pixels to the peripheral circuit with the predetermined voltage.

The connection element electrically may separate the elements from the peripheral circuit while the peripheral circuit is performing operation in regard to imaging, the operation being different from the initialization of the pixels.

The predetermined voltage may be a positive voltage.

The peripheral circuit may be connected to power supply supplying power at the predetermined voltage. And the connection element temporarily may connect the elements to the power supply by connecting the elements to the peripheral circuit in the initialization of the pixels.

The solid-state image sensor may further include a power supply controller supplying power at the predetermined voltage to the peripheral circuit in the initialization of the pixels, and supplying power at a voltage different from the predetermined voltage to the peripheral circuit when the peripheral circuit is performing the operation in regard to imaging, the operation being different from the initialization of the pixels.

The predetermined voltage may be a negative voltage or zero.

According to an embodiment of the present technology, there is provided a driving method of a solid-state image sensor including a pixel circuit having a plurality of pixels and imaging a subject, a peripheral circuit provided in a vicinity of the pixel circuit and performing operation in regard to imaging, and a connection element connecting elements in the pixels to the peripheral circuit, the method including electrically connecting, by the connection element, in initialization of the pixels, the elements in the pixels to which a predetermined voltage is applied for initializing the pixels to the peripheral circuit with the predetermined voltage.

According to one embodiment of the present technology, there is provided a solid-state image sensor including: a pixel circuit having a plurality of pixels and imaging a subject; a peripheral circuit provided in the vicinity of the pixel circuit and performing operation in regard to imaging; and a connection element connecting elements in the pixels to the peripheral circuit, the connection element electrically connecting, in initialization of the pixels, the elements in the pixels to which a predetermined voltage is applied for initializing the pixels to the peripheral circuit with the predetermined voltage.

According to one embodiment of the present technology, increase in area of an image sensor can be suppressed and impedance of pixels can be reduced.

DETAILED DESCRIPTION OF THE EMBODIMENT(S)

Figure 1:
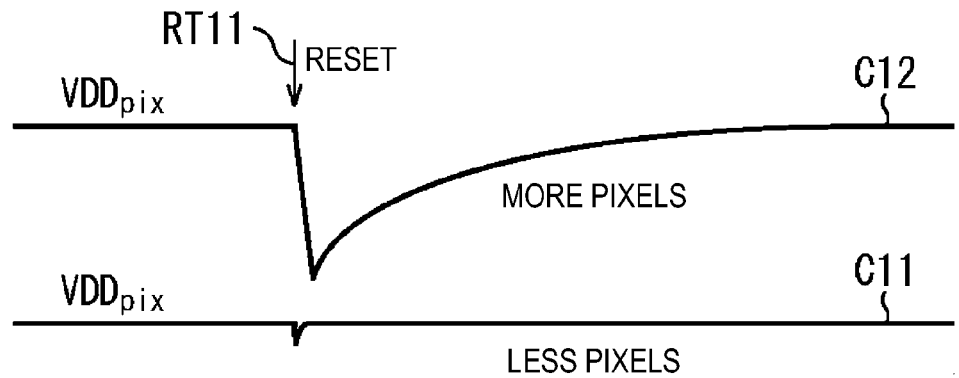
FIG. 1 is a diagram for explaining a power supply drop.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

<First Embodiment>
[Summary of Present Technology]

First, summary of the present technology is described.

A larger number of pixels in an image sensor (solid-state image sensor) and/or driving in a shutter method in which exposure periods for all the pixels are coincident with one another increase the number of pixels which are reset simultaneously, this leading to an increase of a drop of pixel power supply caused by the reset of the pixels.

For example, as indicated by the curve C11 in FIG. 1, in case where a small number of pixels are reset simultaneously, although a drop of pixel power supply (an instant decrease of pixel power supply) takes place caused by the reset of the pixels, the decrease in voltage is just small. In addition, in FIG. 1, the horizontal direction corresponds to time and the vertical direction corresponds to voltage of the pixel power supply. Moreover, the position of the arrow RT11 in the horizontal direction in the figure indicates the time point when the pixels are reset.

The voltage of the pixel power supply indicated by the curve C11 slightly decreases at the time of the reset of the pixels, and after that, recovers immediately. Herein, the voltage of the pixel power supply is a voltage applied to a reset transistor, for example, for setting the potential of a floating diffusion region in each pixel to the level of a reset voltage, that is, a voltage of a power supply connected to the reset transistor.

On the contrary, in case where a large number of pixels are reset simultaneously, as indicated by the curve C12, the voltage of the pixel power supply significantly decreases at the time of the reset of the pixels, and it takes time until the voltage recovers.

As mentioned above, when wirings in the pixels and/or wirings to the pixels are made thick to reduce impedance of the pixels (pixel power supply), such a drop of pixel power supply in driving for initializing the pixels, for example, in resetting the pixels can be relieved. This, however, increases wiring areas (sensor areas) in the image sensor, and thus, costs.

Therefore, in the present technology, a connection element connects a peripheral circuit that is provided in the vicinity of pixels and does not operate in initialization of the pixels, for example, in resetting the pixels to the pixels, and is turned ON in the initialization of the pixels to temporarily supply power to the pixels. Namely, in the initialization of the pixels, to the terminals (drains) of reset transistors to which a power supply voltage is applied by a pixel power supply, the same voltage is applied also from the peripheral circuit.

Herein, examples of the peripheral circuit include a load MOS circuit which is a load current source upon selection of the pixel, ADCs (Analog Digital Converters) which are arranged in a column-parallel manner and convert electric signals read out from the pixels from analog signals into digital signals, and a driver controlling drive of the pixels. Namely, the peripheral circuit may be any circuit provided close to the pixels and performing operation in regard to imaging.

Typically, an image sensor does not basically have a peripheral circuit, which faces the pixels, dynamically operating in a period when the pixels are initialized (reset). Namely, for example, operation of turning ON or OFF pulse signals (voltage signals) supplied to the pixels, or the like, is not performed. Therefore, during the initialization period of the pixels, connection of the peripheral circuit to the pixels does not exert a harmful influence thereon such as propagation of noise from the peripheral circuit to the pixels.

Moreover, in the present technology, at the end of the initialization operation of the pixels, the connection element is turned OFF, and the reset transistors in the pixels and the peripheral circuit are electrically separated from each other in order to prevent noise generated in the peripheral circuit from propagating to the pixels.

Thereby, in the present technology, only providing a connection element connecting a peripheral circuit to pixels in addition to wirings of an image sensor of the past enables to reduce impedance of the pixels without increase of wirings in the pixels and/or wirings from the vicinity of the pixels to the pixels. And thus, the suppression of increase in area of the image sensor enables to reduce costs in manufacturing the image sensor.

[Exemplary Configuration of Solid-State Image Sensor]

Next, a specific embodiment of a solid-state image sensor to which the present technology is applied is described.

Figure 2:
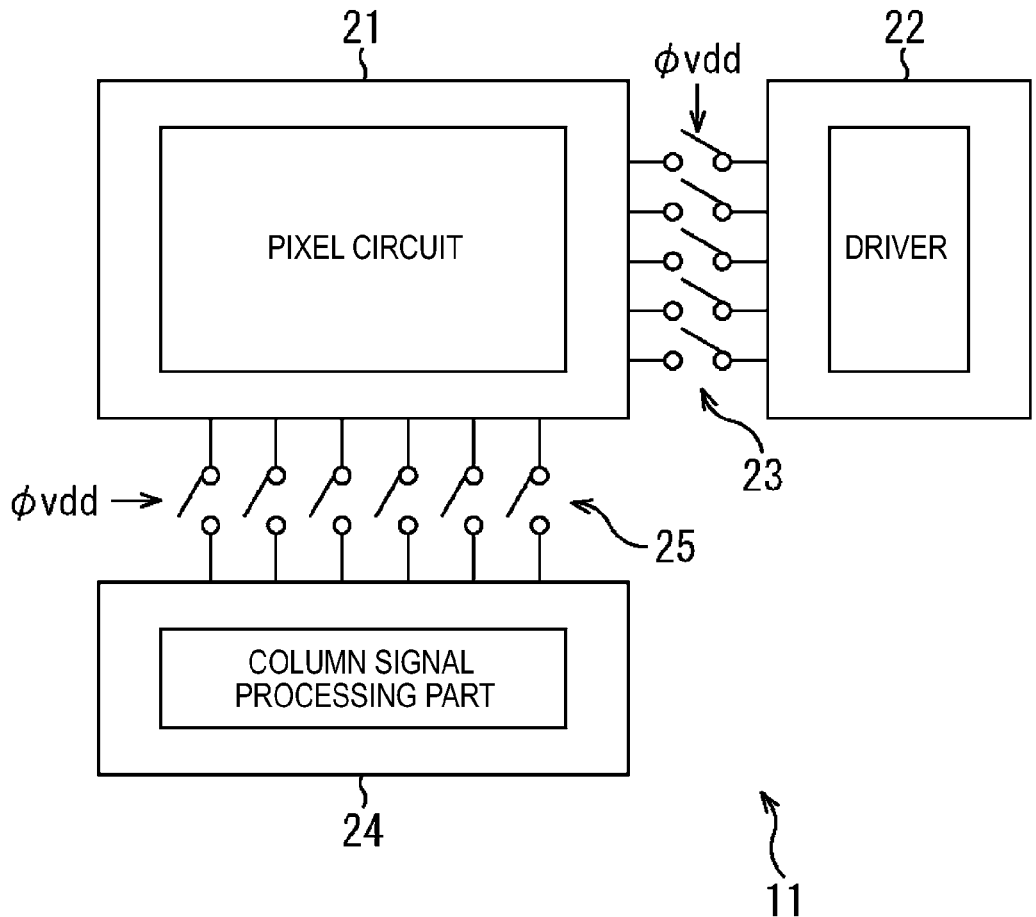
FIG. 2 is a diagram illustrating an exemplary configuration of a solid-state image sensor.

FIG. 2 is a diagram illustrating an exemplary configuration of one embodiment of a solid-state image sensor to which the present technology is applied.

A solid-state image sensor 11 is configured, for example, of a CMOS (Complementary Metal Oxide Semiconductor) image sensor or the like.

The solid-state image sensor 11 includes a pixel circuit 21, a driver 22, connection elements 23, a column signal processing part 24 and connection elements 25.

The pixel circuit 21 includes a plurality of pixels arranged in the horizontal direction and in the vertical direction in the figure, each of which pixels performs photoelectric conversion on light from the subject to generate an electric signal. The pixel circuit 21 outputs the electric signal obtained from each pixel.

Each of the pixels constituting the pixel circuit 21 includes, for example, a photoelectric transducer such as a photodiode receiving light from the subject, a floating diffusion region accumulating photocharge obtained by the photoelectric transducer, a transfer transistor for transferring the charge from the photoelectric transducer to the floating diffusion region, and the like.

Each pixel, moreover, includes an amplification transistor converting a potential change in the floating diffusion region into an electric signal, a selection transistor outputting the electric signal read out by the amplification transistor to a vertical signal line connected to pixels arranged in the vertical direction, and the like.

Each pixel, furthermore, includes a reset transistor setting the potential of the floating diffusion region to the level of a reset voltage by discharging the accumulated charge from the floating diffusion region to the outside or by injecting charge from the outside to the floating diffusion region in initialization of the pixel, for example, in resetting the pixel. To the drain of the reset transistor, a pixel power supply is connected in order to discharge or inject the charge in the floating diffusion region.

As above, each pixel of the pixel circuit 21 includes the photoelectric transducer, floating diffusion region, transfer transistor, amplification transistor, selection transistor and reset transistor, whereas the pixel may have any other configuration. Namely, the pixel only has to include, at least, a configuration for performing the photoelectric conversion, a configuration for reading out the charge obtained by the photoelectric conversion as an electric signal, and a configuration for initializing the pixel.

The driver 22 is connected to elements constituting each pixel of the pixel circuit 21 via signal lines not illustrated in the figure, and controls drive of each pixel with power from the power supply not illustrated in the figure.

For example, the driver 22 applies voltage to the individual gates of the transfer transistor, selection transistor and reset transistor constituting the pixel, and thereby, controls transfer of the charge to the floating diffusion region, selection of the pixel from which the pixel signal is to be read out, and initialization of the pixel (floating diffusion region).

Moreover, the driver 22 is connected to the individual pixels of the pixel circuit 21 via the plurality of connection elements 23. Each connection element 23 is constituted of a switch connecting the pixel of the pixel circuit 21 to the power supply, not illustrated in the figure, connected to the driver 22, and applies a power supply voltage to the pixel by switching ON/OFF according to the applied voltage. For example, the terminal of the connection element 23 on the pixel circuit 21 side is connected to the terminal of the reset transistor constituting the pixel to which the pixel power supply is connected, specifically, to the drain of the reset transistor. Moreover, the terminal of the connection element 23 on the pixel circuit 21 side is also connected to the drain of the amplification transistor.

The column signal processing part 24 is connected to vertical signal lines provided for the pixel circuit 21, and supplies a bias current to each vertical signal line with power from the power supply not illustrated in the figure. Namely, the column signal processing part 24 includes a load MOS circuit as a load current source for each pixel.

Moreover, the column signal processing part 24 performs correlated double sampling, auto gain control processing, A/D conversion processing and the like based on the electric signal read out from the vertical signal line in the pixel circuit 21 to generate the pixel signal of each pixel. Signals constituted of the pixel signals of the individual pixels thus obtained are to be an image signal of the image obtained by imaging the subject.

Furthermore, the column signal processing part 24 is connected to the individual pixels of the pixel circuit 21 via the plurality of connection elements 25. Each connection element 25 is constituted of a switch connecting the pixel of the pixel circuit 21 to the power supply, not illustrated in the figure, connected to the column signal processing part 24, and applies a power supply voltage to the pixel by switching ON/OFF according to the applied voltage.

For example, the terminal of the connection element 25 on the pixel circuit 21 side is connected to the terminal of the reset transistor constituting the pixel to which the pixel power supply is connected, that is, to the drain of the reset transistor. Moreover, the terminal of the connection element 25 on the pixel circuit 21 side is also connected to the drain of the amplification transistor.

[Explanation of Operation of Solid-State Image Sensor]

Next, operation of the solid-state image sensor 11 is described.

Upon starting imaging by the solid-state image sensor 11, first, for several pixels in the pixel circuit 21, a selection pulse (voltage) is supplied by the driver 22 to the gates of the selection transistors constituting the pixels, and the pixels are set to the state of being selected, that is, set to the state in which electric signals are to be outputted from the pixels to the vertical signal lines.

At this stage, the vertical signal lines of the pixel circuit 21 are set to the state of bias currents supplied from the column signal processing part 24. Moreover, in this state, the switches of the connection elements 23 and connection elements 25 are turned OFF, and thus, the driver 22 and column signal processing part 24 are not electrically connected to the drains of the reset transistors in the pixels of the pixel circuit 21.

Subsequently, initialization (reset) of the selected pixels is performed with a reset pulse. Namely, the driver 22 applies the reset pulse (voltage) to the gates of the reset transistors constituting the selected pixels of the pixel circuit 21, and turns ON the gates.

Then, the floating diffusion regions are electrically connected to the pixel power supply via the reset transistors, and the floating diffusion regions, that is, pixels undergo the initialization. In addition, in the initialization of the pixels, the transfer transistors in the selected pixels in the pixel circuit 21 are turned OFF and allowed not to transfer charges from the photoelectric transducers to the floating diffusion regions.

Moreover, when the gates of the reset transistors are turned ON, voltages are applied to the connection elements 23 and connection elements 25 to turn ON the switches. Thereby, the terminals (drains) on the side of the reset transistors to which the pixel power supply is connected are electrically connected to the driver 22 and column signal processing part 24 via the connection elements 23 and connection elements 25. Namely, the terminals of the rest transistors to which predetermined voltages are applied due to the pixel power supply are electrically connected to a peripheral circuit such as the driver 22 and column signal processing part 24 to which the same voltage is applied.

In other words, the terminals of the reset transistors on the pixel power supply side are electrically connected to the power supply connected to the driver 22 and/or the column signal processing part 24. Herein, the pixel power supply connected to the reset transistors and the power supply connected to the driver 22 and/or the column signal processing part 24 are power supply for the same positive voltage.

As above, the pixels are temporarily connected to the power supply via the connection elements 23 and/or the connection elements 25, thereby, impedance of the pixels (pixel power supply) can be reduced, and thus, a drop of power supply due to the initialization of the pixels can be reduced.

In addition, during the initialization (reset) period of the pixels, for example, the reset pulse (voltage) is supplied from the driver 22 to the gates of the reset transistors in the pixels, and/or the bias current is supplied by the column signal processing part 24 to the vertical signal lines. During the reset period of the pixels, however, the voltage (pulse) supplied by the driver 22 and/or the column signal processing part 24 to the elements in the pixels is constant, and dynamic operation such as turning ON/OFF the gates is not performed. Accordingly, during the reset period of the pixels, it can be regarded that the peripheral circuit such as the driver 22 and column signal processing part 24 does not operate.

Upon resetting the pixels, the driver 22 turns OFF the gates of the reset transistors constituting the selected pixels not to initialize the floating diffusion regions.

At this stage, the switches of the connection elements 23 and connection elements 25 are turned OFF, and thus, the terminals of the reset transistors on the pixel power supply side are electrically separated from the driver 22 and column signal processing part 24. Namely, the terminals of the reset transistors on the pixel power supply side are electrically separated from the power supply connected to the driver 22 and/or the column signal processing part 24.

As above, after the initialization of the pixels, the terminals of the reset transistors on the pixel power supply side are separated from the driver 22 and/or the column signal processing part 24 because readout operation of the pixel signals is performed after the initialization of the pixels in the solid-state image sensor 11.

In the readout operation, the pixel circuit 21, the driver 22 and column signal processing part 24 in its vicinity, and the like operate dynamically. Therefore, if the switches of the connection elements 23 and connection elements 25 remain turned ON, noise propagates to the pixels via the power supply of the driver 22 and/or the column signal processing part 24.

Hence, in the solid-state image sensor 11, during the initialization period of the pixels in which the vicinity of the pixels does not operate, the switches of the connection elements 23 and connection elements 25 are turned ON to allow the driver 22 and/or the column signal processing part 24 to reduce the impedance of the pixels. Then, when the vicinity of the pixels operates, the switches of the connection elements 23 and connection elements 25 are turned OFF to suppress the propagation of the noise to the pixels.

Thereby, the width of the power supply wirings of the pixel circuit 21 and/or its vicinity can be left thin, and thus, increase in wiring areas, that is, increase in area of the solid-state image sensor 11 can be suppressed and impedance of the pixels (pixel power supply) can be reduced. Moreover, the suppression of increase in wiring areas enables to reduce costs in manufacturing the image sensor (solid-state image sensor 11).

After initializing the pixels, the pixel signals are read out from the pixels. In addition, at the end of the initialization of the pixels, the gates of the selection transistors are turned ON, and the gates of the transfer transistors and reset transistors are turned OFF. Moreover, the switches of the connection elements 23 and connection elements 25 are turned OFF.

In such a state, the column signal processing part 24 reads out voltages on the vertical signal lines as reset levels.

Then, the driver 22 applies a transfer pulse (voltage) to the gates of the transfer transistors constituting the selected pixels in the pixel circuit 21, allowing the charges accumulated in the photoelectric transducers during the period by the present time to be transferred to the floating diffusion regions. After that, the gates of the transfer transistors are turned OFF, this allowing the transfer pulse not to be applied to the gates of the transfer transistors.

Since transferring the charges to the floating diffusion regions allows the potentials of the floating diffusion regions to change, the column signal processing part 24 reads out the voltages of the vertical signal lines as signal levels. Furthermore, the driver 22 turns OFF the gates of the selection transistors of the selected pixels to separate the pixels from the vertical signal lines.

Moreover, the column signal processing part 24 outputs the differences between the read-out reset levels and signal levels as values of the pixel signals. At this stage, A/D conversion processing and/or auto gain control processing are performed as necessary. After that, the solid-state image sensor 11 repeats the above-mentioned processing the desired number of times as switching the selected pixels, and ends the imaging processing.

As above, the solid-state image sensor 11 performs imaging, and outputs an image signal constituted of pixel signals of individual pixels.

Figure 3:
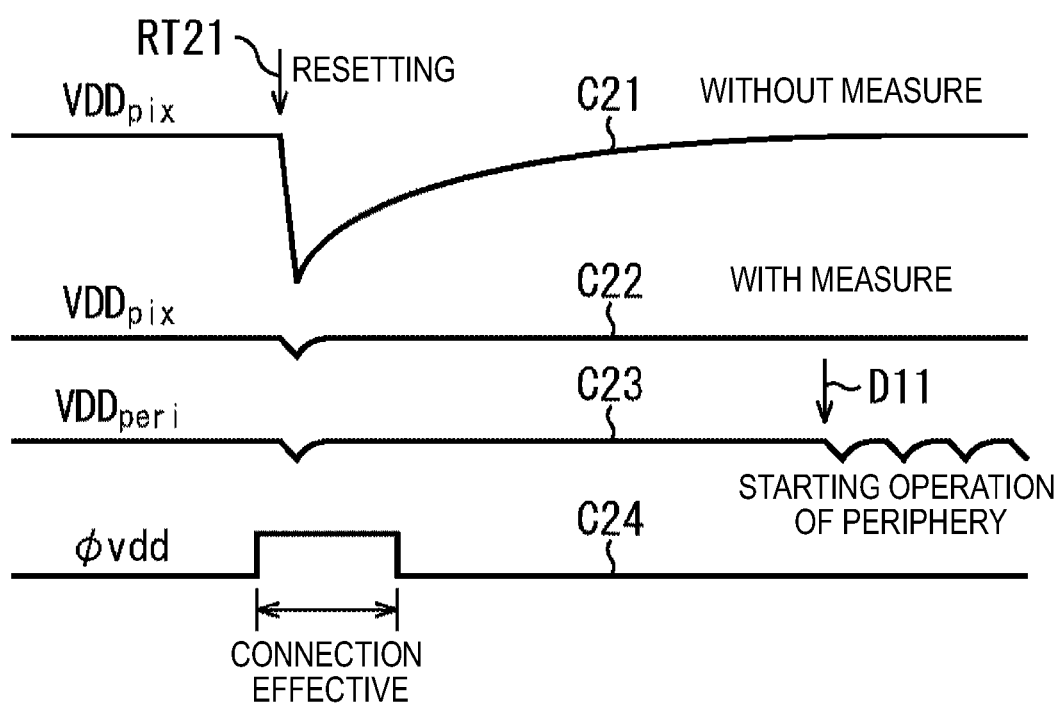
FIG. 3 is a diagram for explaining reduction of the power supply drop.

In the solid-state image sensor 11, connecting the power supply of the driver 22 and/or the column signal processing part 24 to the selected pixels in the initialization of the pixels in order to reduce the impedance of the pixels enables to reduce a drop of power supply arising in the initialization of the pixels, for example, as illustrated in FIG. 3.

In addition, in FIG. 3, the horizontal direction corresponds to time and the vertical direction corresponds to voltage. Moreover, the position of the arrow RT21 in the horizontal direction in the figure indicates the time point when the pixels are initialized (reset).

In FIG. 3, the curve C21 indicates voltage of the pixel power supply, that is, voltage at the terminal of the reset transistor on the power supply side according to time in case where the power supply of the driver 22 and/or the column signal processing part 24 is not connected to the selected pixels in the initialization of the pixels. On the contrary, the curve C22 indicates voltage of the pixel power supply according to time in case where the power supply of the driver 22 and/or the column signal processing part 24 is connected to the selected pixels in the initialization of the pixels.

Moreover, the curve C23 indicates voltage of a peripheral circuit disposed in the vicinity of the pixel circuit 21 such, for example, as the driver 22 and the column signal processing part 24 according to time, and the polygonal line C24 indicates a voltage signal (pulse) supplied to the connection elements 23 and connection elements 25.

Herein, the voltage of the voltage signal indicated by the polygonal line C24 is the voltage at which the switches constituting the connection elements 23 and connection elements 25 are turned ON, during the period with the curve being convex upward, and is the voltage at which the switches are turned OFF, during the other period. In this example, the switches constituting the connection elements 23 and connection elements 25 are turned ON immediately before the initialization of the pixels.

In the example of FIG. 3, when the power supply of the driver 22 and/or the column signal processing part 24 is not connected to the selected pixels in the initialization of the pixels, as indicated by the curve C21, the voltage of the pixel power supply significantly decreases at the time of the initialization of the pixels, and it takes time until the voltage recovers.

On the contrary, when the voltage signal indicated by the polygonal line C24 is supplied to the connection elements 23 and connection elements 25 and the power supply of the driver 22 and/or column signal processing part 24 is connected to the selected pixels in the initialization of the pixels, the voltage of the pixel power supply changes as indicated by the curve C22.

Namely, although the voltage of the pixel power supply indicated by the curve C22 slightly decreases in the initialization of the pixels, the decrease amount is drastically small compared with that indicated by the curve C21 and the drop of power supply recovers instantly.

Moreover, in this case, since the power supply of the driver 22 and/or the column signal processing part 24 is connected to the pixels, the voltage of the peripheral circuit such as the driver 22 and the column signal processing part 24 also slightly decreases in the initialization of the pixels, and after that, recovers immediately as indicated by the curve C23.

Being apparent from the curve C22 and curve C23, in the solid-state image sensor 11, although a slight drop of power supply arises in initialization of pixels, the drop of power supply recovers instantly, this allowing the solid-state image sensor 11 to operate fast.

Moreover, the voltage of the peripheral circuit indicated by the curve C23 changes upward and downward with a subtle amplitude according to operation of the peripheral circuit, for example, operation of supplying voltage to the elements in the pixels for the readout operation of the signals from the pixels and the like, after the initialization of the pixels, that is, after the time point indicated by the arrow D11. Since the switches constituting the connection elements 23 and connection elements 25 are turned OFF after the time point indicated by the arrow D11, the noise does not propagate from the peripheral circuit to the pixels.

As above, the power supply of the driver 22 and/or column signal processing part 24 is connected to the selected pixels continuously during the initialization period of the pixels, whereas the power supply only has to be connected to the pixels during at least part of period in the initialization period. Specifically, as long as the power supply of the driver 22 and/or column signal processing part 24 is connected to the selected pixels at turning ON the gates of the reset transistors, that is, at the beginning of resetting the pixels, the time point of ending the connection may be before or after ending the initialization.

Moreover, the period in which the power supply of the driver 22 is connected to the pixels may be same as or different from the period in which the power supply of the column signal processing part 24 is connected to the pixels.

<Second Embodiment>

[Exemplary Configuration of Solid-State Image Sensor]

Incidentally, there is also the case that the power supply voltage supplied to the peripheral circuit is different from the voltage of the pixel power supply. In such a case, the voltage applied to the pixels via the peripheral circuit may be matched with the voltage of the pixel power supply to connect the peripheral circuit to the pixels, under the conditions that the pixels and the peripheral circuit do not malfunction.

Figure 4:
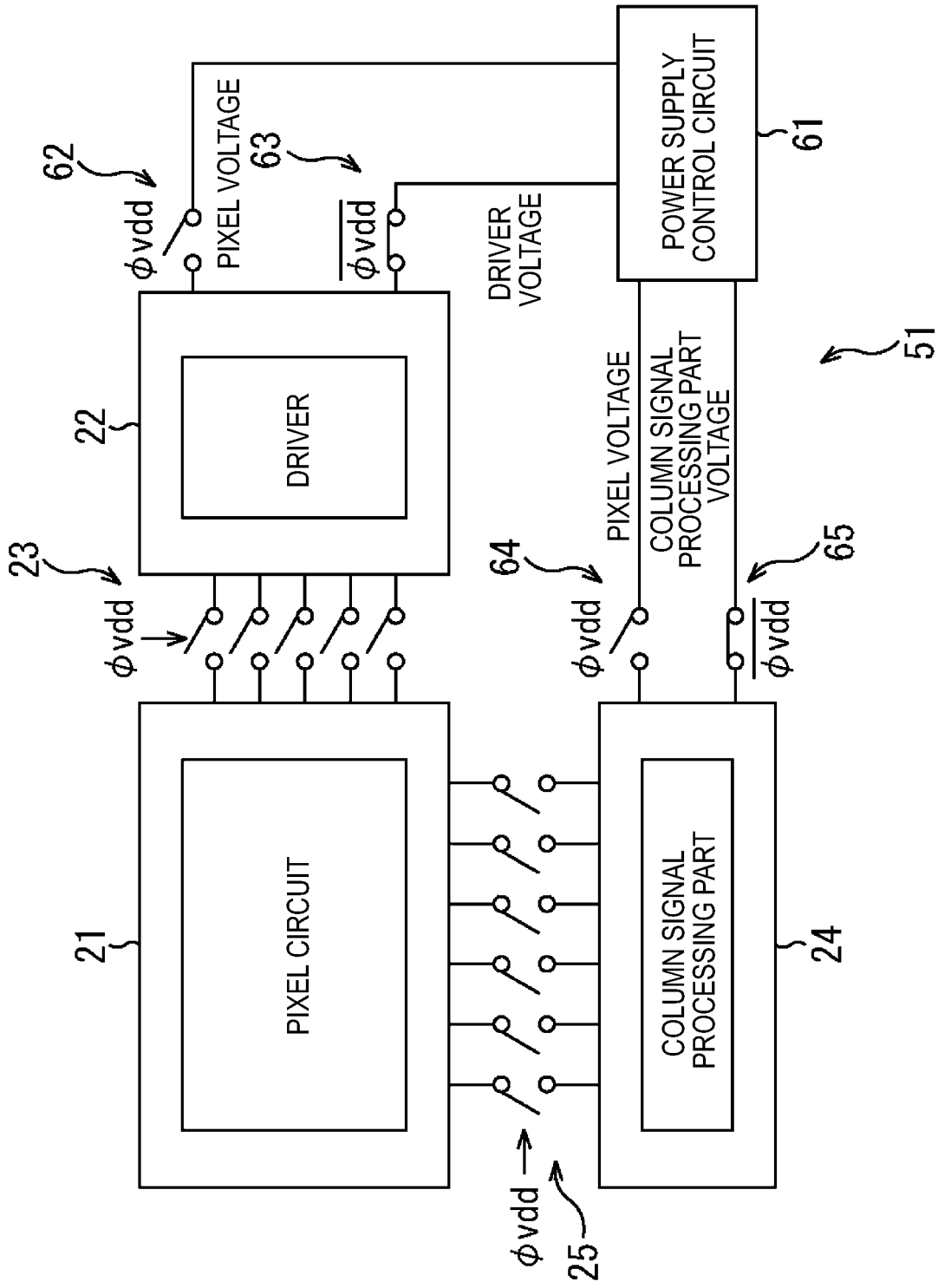
FIG. 4 is a diagram illustrating an exemplary configuration of the solid-state image sensor.

In this case, the solid-state image sensor is configured, for example, as illustrated in FIG. 4. In addition, the parts corresponding to those in FIG. 2 are provided with the same reference signs in FIG. 4, and their description will be omitted appropriately.

A solid-state image sensor 51 illustrated in FIG. 4 includes a pixel circuit 21, a driver 22, connection elements 23, a column signal processing part 24, connection elements 25, a power supply control circuit 61, a connection element 62, a connection element 63, a connection element 64 and a connection element 65. Namely, the solid-state image sensor 51 includes a configuration of the solid-state image sensor 11 in FIG. 2 additionally provided with the power supply control circuit 61 and the connection element 62 to connection element 65.

In this example, a voltage $VDD_{pix}$ of pixel power supply supplied to the drains of the reset transistors of individual pixels constituting the pixel circuit 21 is different in magnitude from a voltage $VDD_{peri}$ of power supply used for driving the pixel circuit 21 by the driver 22 and/or column signal processing part 24.

Since the voltage $VDD_{pix}$ is different from the voltage $VDD_{peri}$, for example, the value of the voltage $VDD_{pix}$ is defined in a range in which the pixels and the peripheral circuit do not malfunction, or the pixels and/or the peripheral circuit are designed so as not to malfunction.

The power supply control circuit 61 is a circuit controlling power supply to the driver 22 and/or the column signal processing part 24 from a power supply not illustrated in the figure, and supplies power to the driver 22 and/or the column signal processing part 24 in different voltages as necessary.

The power supply control circuit 61 and driver 22 are connected to each other via the connection element 62 and connection element 63 constituted of switches and the like.

The connection element 62 and connection element 63 are constituted of switches and the like, and supplies power to the driver 22 by turning ON/OFF the switches according to the applied voltage.

For example, in the initialization of the pixels, the switch of the connection element 62 is turned ON, and the switch of the connection element 63 is turned OFF. Thereby, in the initialization of the pixels, the power is supplied from the power supply control circuit 61 to the driver 22 at the same voltage as the voltage of the pixel power supply.

Moreover, during the period except the initialization of the pixels, the switch of the connection element 62 is turned OFF, and the switch of the connection element 63 is turned ON, this allowing the power to be supplied from the power supply control circuit 61 to the driver 22 at the same voltage as the voltage $VDD_{peri}$.

Similarly to the driver 22, the power supply control circuit 61 and column signal processing part 24 are connected to each other via the connection element 64 and connection element 65 constituted of switches and the like. The connection element 64 and connection element 65 are constituted of switches and the like, and supplies power to the column signal processing part 24 by turning ON/OFF the switches according to the applied voltage.

For example, in the initialization of the pixels, the switch of the connection element 64 is turned ON, and the switch of the connection element 65 is turned OFF. Thereby, in the initialization of the pixels, the power is supplied from the power supply control circuit 61 to the column signal processing part 24 at the same voltage as the voltage of the pixel power supply $VDD_{pix}$.

Moreover, during the period except the initialization of the pixels, the switch of the connection element 64 is turned OFF, and the switch of the connection element 65 is turned ON, this allowing the power to be supplied from the power supply control circuit 61 to the column signal processing part 24 at the same voltage as the voltage $VDD_{peri}$.

For example, in the solid-state image sensor 51, the connection element 62 and connection element 64 are controlled so as to be turned ON at the time of turning ON the connection elements 23 and connection elements 25 and to be turned OFF at the time of turning OFF the connection elements 23 and the connection elements 25. Conversely, the connection element 63 and connection element 65 are controlled so as to be turned OFF at the time of turning ON the connection elements 23 and connection elements 25 and to be turned ON at the time of turning OFF the connection elements 23 and connection elements 25.

[Explanation of Operation of Solid-State Image Sensor]

The solid-state image sensor 51 as above operates basically same as the solid-state image sensor 11 in FIG. 2. However, the voltages of the power supplied in the initialization of pixels and during the period except the initialization of the pixels, respectively, from the power supply control circuit 61 to the driver 22 and column signal processing part 24 are switched.

Namely, before the initialization of the pixels, the switches of the connection element 62 and connection element 64 are turned OFF, and the switches of the connection element 63 and connection element 65 are turned ON.

Accordingly, the power at the voltage $VDD_{peri}$ is supplied from the power supply control circuit 61 to the driver 22 and column signal processing part 24, and the driver 22 and column signal processing part 24 drive the pixel circuit 21 based on the power thus supplied. For example, regarding several pixels constituting the pixel circuit 21, the driver 22 applies a selection pulse at the voltage $VDD_{peri}$ to the gates of the selection transistors constituting the pixels.

In addition, in this state, the switches of the connection elements 23 and connection elements 25 are turned OFF.

Then, in the initialization of the pixels, more in detail, immediately before performing the initialization of the pixels, the switches of the connection element 62 and connection element 64 are turned ON, and the switches of the connection element 63 and connection element 65 are turned OFF.

Thereby, the power at the voltage $VDD_{pix}$ is supplied from the power supply control circuit 61 to the driver 22 and column signal processing part 24.

At the same time, the switches of the connection elements 23 and connection elements 25 are turned ON. Thereby, the terminals of the reset transistors on the side to which the pixel power supply is connected are electrically connected to the driver 22 and column signal processing part 24 via the connection elements 23 and connection elements 25. Namely, the voltage $VDD_{pix}$ is applied from the power supply control circuit 61 connected to the driver 22 and/or the column signal processing part 24 to the terminals of the reset transistors on the pixel power supply side.

Moreover, at the time of the initialization of the pixels, the driver 22 applies a reset pulse (voltage) to the gates of the reset transistors constituting the selected pixels of the pixel circuit 21 and turned ON the gates to initialize the pixels. At this stage, the voltage applied to the gates of the reset transistors is $VDD_{pix}$.

As above, the pixels are temporarily connected to the power supply via the connection elements 23 and/or the connection elements 25, thereby, impedance of the pixels can be reduced, and thus, a drop of power supply due to the initialization of the pixels can be reduced.

The initialization of the pixels is ended by turning OFF the gates of the reset transistors constituting the selected pixels by the driver 22.

At this stage, the switches of the connection elements 23 and connection elements 25 are turned OFF, and the terminals of the reset transistors on the pixel power supply side are electrically separated from the driver 22 and column signal processing part 24. At the same time, the switches of the connection element 62 and connection element 64 are turned OFF, and the switches of the connection element 63 and connection element 65 are turned ON. Thereby, the power at the voltage $VDD_{peri}$ is supplied from the power supply control circuit 61 to the driver 22 and column signal processing part 24.

After the initialization of the pixels is ended and the selected pixels of the pixel circuit 21 are separated from the power supply of the driver 22 and column signal processing part 24, readout operation of pixel signals from the selected pixels is performed.

At this stage, the driver 22 and/or the column signal processing part 24 drive the pixel circuit 21 using the power at the voltage $VDD_{peri}$ supplied from the power supply control circuit 61. For example, the driver 22 supplies a transfer pulse at the voltage $VDD_{peri}$ to the gates of the transfer transistors constituting the pixels to perform the readout operation of the pixel signals.

As above, the solid-state image sensor 51 switches the voltages of the power supplied in the initialization period of the pixels and during the period except that, respectively, from the power supply control circuit 61 to the driver 22 and column signal processing part 24. In the initialization period of the pixels, the voltage $VDD_{pix}$ different from the voltage $VDD_{peri}$ which is to be applied originally is applied to the driver 22 and the elements such as the reset transistors constituting the pixels of the pixel circuit 21. Therefore, it is the premise that the peripheral circuit such as the driver 22 and/or the column signal processing part 24 and the pixel circuit 21 do not malfunction or break at the voltage $VDD_{pix}$.

According to the above-mentioned operation, in the solid-state image sensor 51, the power supply of the driver 22 and/or the column signal processing part 24 is electrically connected to the selected pixels in the initialization of the pixels, this enabling to reduce impedance of the pixels.

Figure 5:
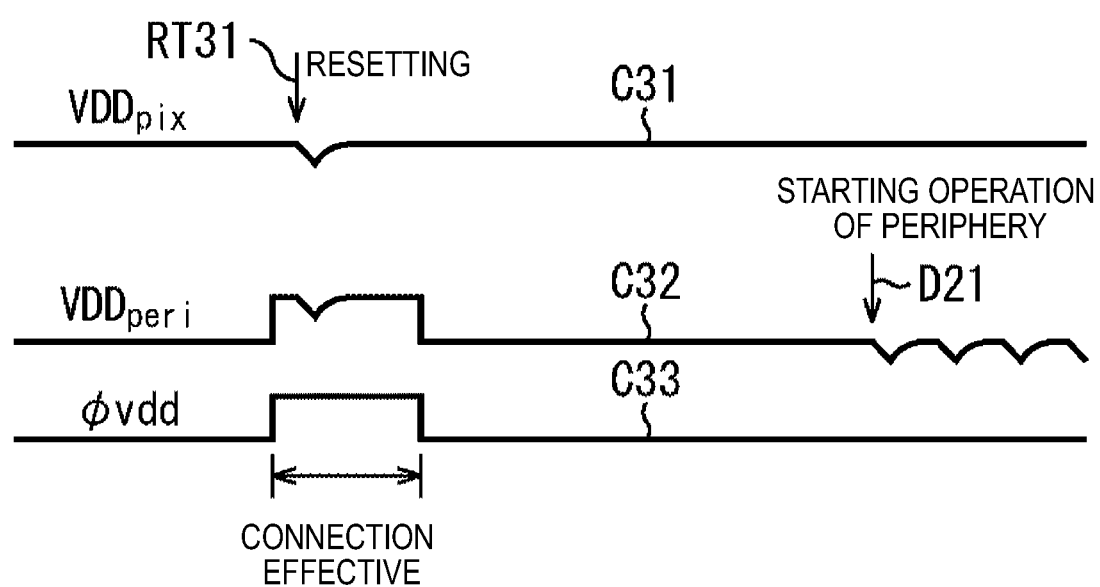
FIG. 5 is a diagram for explaining reduction of the power supply drop.

Thereby, for example, as illustrated in FIG. 5, a drop of power supply due to the initialization of the pixels can be reduced.

In addition, in FIG. 5, the horizontal direction corresponds to time and the vertical direction corresponds to voltage. Moreover, the position of the arrow RT31 in the horizontal direction in the figure indicates the time point when the pixels are initialized.

In FIG. 5, the curve C31 indicates voltage of the pixel power supply according to time in case where the power supply of the driver 22 and/or the column signal processing part 24 is connected to the selected pixels in the initialization of the pixels. Moreover, the curve C32 indicates voltage of the peripheral circuit disposed in the vicinity of the pixel circuit 21 such, for example, as the driver 22 or the column signal processing part 24 according to time.

Furthermore, the polygonal line C33 indicates a voltage signal (pulse) supplied to the connection elements 23, connection elements 25, connection element 62 and connection element 64. Herein, the voltage of the voltage signal indicated by the polygonal line C33 is the voltage at which the switches constituting the connection elements 23, connection elements 25, connection element 62 and connection element 64 are turned ON, during the period with the curve being convex upward, and the voltage at which the switches are turned OFF, during the other period.

In the example of FIG. 5, the voltage signal indicated by the polygonal line C33 is supplied to the connection elements 23, connection elements 25, connection element 62 and connection element 64, and the power supply of the driver 22 and/or the column signal processing part 24 is connected to the selected pixels in the initialization of the pixels. Under these conditions, the voltage of the pixel power supply changes as indicated by the curve C31.

Namely, although the voltage of the pixel power supply indicated by the curve C31 slightly decreases in the initialization of the pixels, the decrease amount is subtle and the drop of power supply recovers instantly.

Moreover, in this case, since the power supply of the driver 22 and/or column signal processing part 24 is connected to the pixels, while the voltage of the peripheral circuit such as the driver 22 and the column signal processing part 24 also slightly decreases in resetting the pixels, after that, it recovers immediately as indicated by the curve C32.

Being apparent from the curve C31 and curve C32, in the solid-state image sensor 51, although a slight drop of power supply arises in resetting pixels, the drop of power supply recovers instantly, this allowing the solid-state image sensor 51 to operate fast.

Moreover, the voltage of the peripheral circuit indicated by the curve C32 is $VDD_{pix}$ basically in the initialization period of the pixels, more in detail, during the period in which the switches of the connection element 62 and connection element 64 are turned ON, and $VDD_{peri}$ during the other period.

Furthermore, the voltage of the peripheral circuit indicated by the curve C32 changes upward and downward with a subtle amplitude according to operation of the peripheral circuit for the readout operation of the signals from the pixels and the like, after the initialization of the pixels, that is, after the time point indicated by the arrow D21. However, since the switches constituting the connection elements 23 and connection elements 25 are turned OFF after the time point indicated by the arrow D21, the noise does not propagate from the peripheral circuit to the pixels.

As above, according to the present technology, pixels are electrically connected to power supply of a peripheral circuit during initialization of the pixels and the pixels are separated from the power supply of the peripheral circuit during a period in which the peripheral circuit operates dynamically, this enabling to suppress increase in area of an image sensor and to reduce impedance of the pixels.

Incidentally, in the above, the peripheral circuit is described, exemplified by the column signal processing part 24 and the driver 22, whereas the peripheral circuit may be any component which is in the vicinity of the pixel circuit 21 and does not operate dynamically in initialization of the pixels. For example, the peripheral circuit may include a circuit performing correlated double sampling and/or a circuit performing A/D conversion.

Moreover, in the above, the power supply wirings are exemplarily described which connect the power supply of the peripheral circuit to the pixel power supply, whereas the present technology is applicable to GND wirings (ground wirings) and/or wirings for negative bias as well as the power supply wirings. Namely, elements in the pixels to which elements a predetermined voltage is applied for initializing the pixels may be electrically connected to the peripheral circuit to which the same voltage is applied.

Herein, the predetermined voltage may be any of a positive voltage, a negative voltage and 0 (0 V). For example, in case where the reset transistors constituting the pixels are P-channel MOS transistors, the grounds of the reset transistors are connected to the ground of the peripheral circuit only during the initialization period of the pixels.

[Exemplary Configuration of Image Capturing Apparatus]

Furthermore, the present technology can be applied to all kinds of electronic equipment in which a solid-state image sensor is used as an image acquisition part (photoelectric conversion part) such as an image capturing apparatus such as a digital still camera and a video camera, a portable terminal apparatus having an image capturing function, and a copy machine in which a solid-state image sensor is used as an image acquisition part. The solid-state image sensor may be integrated into one chip, or may be a module having an image capturing function which is packaged collectively of an imaging unit and a signal processing unit or an optical system.

Figure 6:
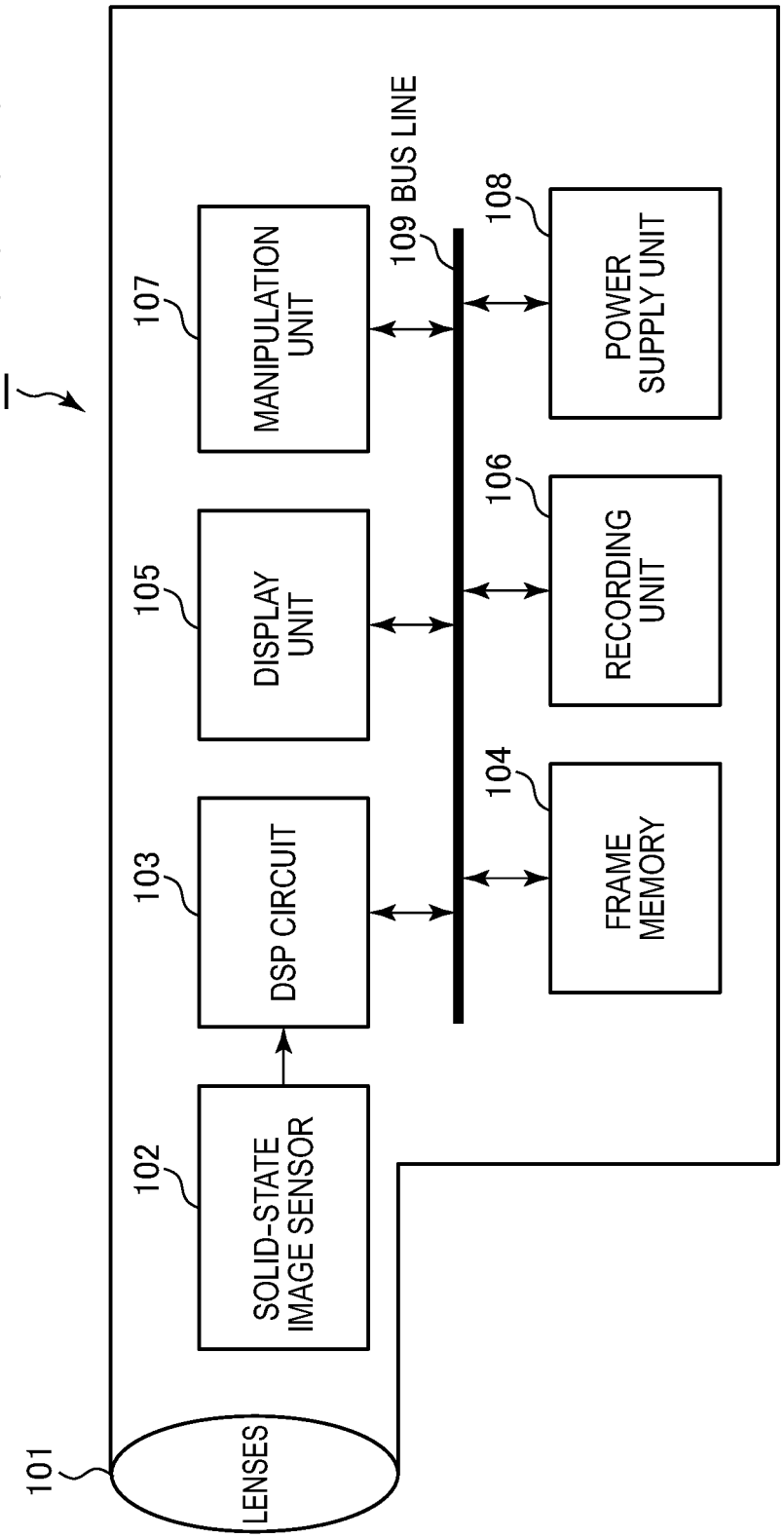
FIG. 6 is a diagram illustrating an exemplary configuration of an image capturing apparatus.

FIG. 6 is a diagram illustrating an exemplary configuration of an image capturing apparatus as electronic equipment to which the present technology is applied.

An image capturing apparatus 91 in FIG. 6 includes an optical unit 101 constituted of lenses and the like, a solid-state image sensor (imaging device) 102, and a DSP (Digital Signal Processor) circuit 103 as a camera signal processing circuits. Moreover, the image capturing apparatus 91 further includes a frame memory 104, a display unit 105, a recording unit 106, a manipulation unit 107 and a power supply unit 108. The DSP circuit 103, frame memory 104, display unit 105, recording unit 106, manipulation unit 107 and power supply unit 108 are connected to one another via a bus line 109.

The optical unit 101 takes incident light (image light) in from the subject to image it on the imaging plane of the solid-state image sensor 102. The solid-state image sensor 102 converts, for each pixel, the light amount of the incident light imaged on the imaging plane by the optical unit 101 into an electric signal to output it as a pixel signal. The solid-state image sensor 102 corresponds to the above-mentioned solid-state image sensor 11 and solid-state image sensor 51.

The display unit 105 is configured, for example, of a panel display device such as a liquid crystal panel and an organic EL (electroluminescent) panel, and displays a moving image or a still image imaged by the solid-state image sensor 102. The recording unit 106 records the moving image or the still image imaged by the solid-state image sensor 102 in a recording medium such as a videotape and a DVD (Digital Versatile Disk).

The manipulation unit 107 issues operation commands for various functions in the image capturing apparatus 91 according to manipulations of the user. The power supply unit 108 appropriately supplies various kinds of power supply as operation power supply of the DSP circuit 103, frame memory 104, display unit 105, recording unit 106 and manipulation unit 107.

Moreover, in the above-mentioned embodiments, application to CMOS image sensors in which pixels are arranged in a matrix shape to detect signal charges according to light amounts of visible light as physical quantities is exemplarily described, whereas the present technology is not limited to the application to such CMOS image sensors but is applicable to all kinds of solid-state image sensors.

Moreover, the present technology is not limited to application to a solid-state image sensor detecting distribution of incident light amounts of visible light to image them as a picture, but is applicable to solid-state image sensors imaging distribution of incident amounts of infrared rays, X-rays, particles or the like as a picture.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A solid-state image sensor including:
a pixel circuit including a plurality of pixels and imaging a subject;
a peripheral circuit provided in a vicinity of the pixel circuit and performing operation in regard to imaging; and
a connection element electrically connecting, in initialization of the pixels, elements in the pixels to which a predetermined voltage is applied for initializing the pixels to the peripheral circuit with the predetermined voltage.

(2) The solid-state image sensor according to (1),
wherein the connection element electrically separates the elements from the peripheral circuit while the peripheral circuit is performing operation in regard to imaging, the operation being different from the initialization of the pixels.

(3) The solid-state image sensor according to (1) or (2),
wherein the predetermined voltage is a positive voltage.

(4) The solid-state image sensor according to (3),
wherein the peripheral circuit is connected to power supply supplying power at the predetermined voltage, and
wherein the connection element temporarily connects the elements to the power supply by connecting the elements to the peripheral circuit in the initialization of the pixels.

(5) The solid-state image sensor according to (3), further including
a power supply controller supplying power at the predetermined voltage to the peripheral circuit in the initialization of the pixels, and supplying power at a voltage different from the predetermined voltage to the peripheral circuit when the peripheral circuit is performing the operation in regard to imaging, the operation being different from the initialization of the pixels.

(6) The solid-state image sensor according to (1) or (2),
wherein the predetermined voltage is a negative voltage or zero.

The present disclosure contains subject matter related to that disclosed in Japanese Priority Patent Application JP 2012-115409 filed in the Japan Patent Office on May 21, 2012, the entire content of which is hereby incorporated by reference.

What is claimed is:

1. A solid-state image sensor comprising:
a pixel circuit that includes a plurality of pixels for imaging a subject, wherein each of the plurality of pixels includes a photoelectric transducer;
a peripheral circuit provided in a vicinity of the pixel circuit, wherein the peripheral circuit is configured to perform an operation in regard to imaging the subject; and
a connection element configured to electrically connect, during initialization of the plurality of pixels, an element in a pixel of the plurality of pixels to which a predetermined voltage is applied for initializing the pixel to the peripheral circuit with the predetermined voltage,
wherein, to initialize the pixel in the plurality of pixels, the peripheral circuit is configured to apply voltages to gates of a transfer transistor, a selection transistor and the reset transistor in the pixel, to turn OFF the transfer transistor and the selection transistor and to turn ON the reset transistor.

2. The solid-state image sensor according to claim 1, wherein the connection element is configured to electrically separate the element from the peripheral circuit while the peripheral circuit is performing the operation in regard to imaging the subject, the operation being different from the initialization of the plurality of pixels.

3. The solid-state image sensor according to claim 1, wherein the predetermined voltage is a positive voltage.

4. The solid-state image sensor according to claim 1,
wherein the peripheral circuit is configured to connect a power supply, wherein the power supply is configured to supply power at the predetermined voltage, and
wherein the connection element is configured to temporarily connect the element to the power supply by connecting the element to the peripheral circuit during the initialization of the plurality of pixels.

5. The solid-state image sensor according to claim 1, further comprising a power supply controller configured to supply power at the predetermined voltage to the peripheral circuit during the initialization of the plurality of pixels, and supply the power at a voltage different from the predetermined voltage to the peripheral circuit when the peripheral circuit is performing the operation in regard to imaging the subject, the operation being different from the initialization of the plurality of pixels.

6. The solid-state image sensor according to claim 1, wherein the predetermined voltage is a negative voltage.

7. The solid-state image sensor according to claim 1, wherein the photoelectric transducer of each of the plurality of pixels is configured to generate an electric signal based on light incident on each of the plurality of pixels from the subject, wherein the solid-state image sensor is configured to capture an image of the subject based on the incident light.

8. The solid-state image sensor according to claim 1, wherein the element is a drain terminal of the reset transistor in the pixel.

9. A driving method comprising:
in a solid-state image sensor that includes a pixel circuit having a plurality of pixels for imaging a subject, a peripheral circuit, provided in a vicinity of the pixel circuit, configured to perform an operation in regard to imaging the subject, and a connection element configured to connect an element in a pixel of the plurality of pixels to the peripheral circuit:
electrically connecting, by the connection element, during initialization of the plurality of pixels, the element in the pixel to which a predetermined voltage is applied for initializing the pixel to the peripheral circuit with the predetermined voltage,
wherein each of the plurality of pixels includes a photoelectric transducer, and
wherein, to initialize the pixel in the plurality of pixels, the peripheral circuit is configured to apply voltages to gates of a transfer transistor, a selection transistor and the reset transistor in the pixel, to turn OFF the transfer transistor and the selection transistor and to turn ON the reset transistor.

10. A solid-state image sensor comprising:
a pixel circuit that includes a plurality of pixels, wherein each of the plurality of pixels includes a photoelectric transducer, wherein the photoelectric transducer is configured to generate an electric signal based on light incident on each of the plurality of pixels from a subject, wherein the solid-state image sensor is configured to capture an image of the subject based on the incident light;
a peripheral circuit provided in a vicinity of the pixel circuit, wherein the peripheral circuit is configured to perform an operation in regard to capturing the image of the subject; and
a connection element configured to electrically connect, during initialization of the plurality of pixels, an element in a pixel of the plurality of pixels to which a predetermined voltage is applied for initializing the pixel to the peripheral circuit with the predetermined voltage,
wherein, to initialize the pixel in the plurality of pixels, the peripheral circuit is configured to apply voltages to gates of a transfer transistor, a selection transistor and the reset transistor in the pixel, to turn OFF the transfer transistor and the selection transistor and to turn ON the reset transistor.

11. A solid-state image sensor comprising:
a pixel circuit including a plurality of pixels for imaging a subject;
a peripheral circuit provided in a vicinity of the pixel circuit, wherein the peripheral circuit is configured to perform an operation in regard to imaging the subject; and
a connection element configured to electrically connect, during initialization of the plurality of pixels, an element in a pixel of the plurality of pixels to which a predetermined voltage is applied for initializing the pixel to the peripheral circuit with the predetermined voltage,
wherein, to initialize the pixel in the plurality of pixels, the peripheral circuit is configured to apply voltages to gates of a transfer transistor, a selection transistor and a reset transistor in the pixel, to turn OFF the transfer transistor and the selection transistor and to turn ON the reset transistor.

12. A solid-state image sensor comprising:
a pixel array that includes a plurality of pixels;
a peripheral circuit provided in a peripheral area of the pixel array; and
a connection element disposed between the pixel array and the peripheral circuit,
wherein the peripheral circuit is configured to apply voltages to gates of a transfer transistor, a selection transistor and the reset transistor in one of the pixels, to turn OFF the transfer transistor and the selection transistor and to turn ON the reset transistor during initialization, and wherein the connection element is configured to electrically connect the peripheral circuit to the plurality of pixels during the initialization.

13. The solid-state image sensor according to claim 12, wherein the connection element is configured to electrically separate the pixel array from the peripheral circuit while the peripheral circuit is performing an operation in regard to imaging a subject, the operation being different from the initialization of the plurality of pixels.

14. The solid-state image sensor according to claim 12,
wherein the peripheral circuit is configured to connect to a power supply configured to supply power at a predetermined voltage, and
wherein the connection element is configured to temporarily connect elements in the plurality of pixels to the power supply by connecting the elements to the peripheral circuit during the initialization of the plurality of pixels.

15. The solid-state image sensor according to claim 14, wherein the predetermined voltage is a positive voltage.

16. The solid-state image sensor according to claim 14, wherein the predetermined voltage is a negative voltage.

17. The solid-state image sensor according to claim 12, further comprising a power supply controller configured to supply power at a predetermined voltage to the peripheral circuit during the initialization of the plurality of pixels, and supply the power at a voltage different from the predetermined voltage to the peripheral circuit when the peripheral circuit is performing an operation in regard to imaging a subject, the operation being different from the initialization of the plurality of pixels.

18. The solid-state image sensor according to claim 12, wherein a photoelectric transducer of each of the plurality of pixels is configured to generate an electric signal based on light incident on each of the plurality of pixels from a subject, wherein the solid-state image sensor is configured to capture an image of the subject based on the incident light.

* * * * *